US009212634B2

(12) United States Patent
Adair

(10) Patent No.: US 9,212,634 B2
(45) Date of Patent: Dec. 15, 2015

(54) ENGINE ENHANCEMENT METHOD AND SYSTEM

(75) Inventor: Christopher Adair, Killarney (IE)

(73) Assignee: Christopher Adair, Killarney (IE)

( * ) Notice: Subject to any disclaimer, the term of this patent is extended or adjusted under 35 U.S.C. 154(b) by 0 days.

(21) Appl. No.: 13/696,752

(22) PCT Filed: May 6, 2011

(86) PCT No.: PCT/EP2011/057353
§ 371 (c)(1),
(2), (4) Date: Nov. 7, 2012

(87) PCT Pub. No.: WO2011/141392
PCT Pub. Date: Nov. 17, 2011

(65) Prior Publication Data
US 2013/0061822 A1    Mar. 14, 2013

(30) Foreign Application Priority Data

May 11, 2010    (IE) .................................. S2010/0301

(51) Int. Cl.
| F02B 43/10 | (2006.01) |
| F02M 25/12 | (2006.01) |
| C25B 1/04 | (2006.01) |
| C25B 15/02 | (2006.01) |

(52) U.S. Cl.
CPC .................. *F02M 25/12* (2013.01); *C25B 1/04* (2013.01); *C25B 15/02* (2013.01); *F02B 43/10* (2013.01); *Y02E 60/366* (2013.01); *Y02T 10/121* (2013.01)

(58) Field of Classification Search
CPC .......... F02B 51/02; F02B 43/04; F02B 43/10; F02B 43/12; F02B 2043/106; F02M 21/02; F02M 27/00; F02M 27/02

USPC ........................................... 123/1 A, 3, 1 R, 2
See application file for complete search history.

(56) References Cited

U.S. PATENT DOCUMENTS

| 4,185,593 | A | * | 1/1980 | McClure ....................... 123/1 A |
| 4,476,817 | A | * | 10/1984 | Lindberg ............................ 123/3 |
| 5,085,176 | A | * | 2/1992 | Brinkley, III ..................... 123/3 |
| 8,025,033 | B2 | * | 9/2011 | Schiltz et al. ................. 123/1 A |
| 8,163,142 | B1 | * | 4/2012 | Stama ............................ 204/278 |

(Continued)

FOREIGN PATENT DOCUMENTS

| CH | 116428 | 8/1926 |
| DE | 2455540 | 5/1976 |

(Continued)

OTHER PUBLICATIONS

Machine translation of Detailed Description for WO2009/018814, Rade et al., Publ'n date Feb. 12, 2009.*

(Continued)

*Primary Examiner* — Lindsay Low
*Assistant Examiner* — Grant Moubry
(74) *Attorney, Agent, or Firm* — Warner Norcross & Judd LLP

(57) ABSTRACT

The present invention provides an engine enhancement system and method which utilizes hydrogen as a combustion catalyst within an internal combustion engine, the hydrogen preferably being obtained and/or replenished from a supply of HHO gas fed to combustion chambers of the engine, and being located at interstitial sites in the walls of the combustion chambers.

12 Claims, 4 Drawing Sheets

(56) References Cited

U.S. PATENT DOCUMENTS

| | | |
|---|---|---|
| 2008/0308056 A1 | 12/2008 | Schiltz et al. |
| 2010/0206721 A1* | 8/2010 | Snidvongs ................ 204/229.8 |
| 2011/0017153 A1* | 1/2011 | Moon et al. ........................ 123/3 |

FOREIGN PATENT DOCUMENTS

| | | |
|---|---|---|
| DE | 3419783 | 5/1985 |
| DE | 3828764 | 3/1990 |
| DE | 102008003126 | 2/2009 |

OTHER PUBLICATIONS

PCT International Search Report regarding Application No. PCT/EP2011/057353 filed May 6, 2011, a counterpart to U.S. Appl. No. 13/696,752.

PCT International Written Opinion regarding Application No. PCT/EP2011/057353 filed May 6, 2011, a counterpart to U.S. Appl. No. 13/696,752.

* cited by examiner

ENGINE ENHANCEMENT METHOD AND SYSTEM

FIELD OF THE INVENTION

This invention relates to an engine enhancement method and system for use with an internal combustion engine, for example as used in an automobile or the like, which system and method yield fuel savings, an improvement in performance, and lower engine emissions and exhaust gas temperatures. The system may also be used with any other suitable combustion based system.

BACKGROUND OF THE INVENTION

Global warming and related environmental issues resulting from industrialisation, in particular the use of fossil fuels and the resulting emissions, is now a well established issue and significant resources are being channelled into various solutions to this problem. One major source of atmospheric pollution is the internal combustion engine used in the tens of millions of automobiles currently in use around the globe. While significant improvements have been made to the automobile internal combustion engine, both to reduce the emissions therefrom and improve fuel consumption, there is still significant room for improvement. In recent years, the use of HHO gas, normally supplied by the electrolysis of water, to supplement the petrol fuel of the engine, has received significant attention.

It is known to add HHO gas, normally via the inlet manifold of an engine, to the combustible petrol fuel, in an attempt to improve the efficiency and/or performance of the engine. The HHO gas is conventionally supplied at a rate of approximately 1 liter of gas per minute for a conventional 2 liter engine. This requires a significant amount of electrical energy to generate the gas via the electrolysis of the respective electrolyte. Thus any improvement in the performance of the engine is somewhat offset by the energy requirements of the electrolytic cell used.

It is an object of the present invention to overcome the above-mentioned problem.

SUMMARY OF THE INVENTION

According to a first aspect of the present invention there is provided a method of combusting a hydrocarbon fuel in an internal combustion engine, the method comprising the step of utilising hydrogen as a combustion catalyst during combustion of the fuel.

Preferably, the method comprises locating the catalytic hydrogen at interstitial sites in a surface of a combustion chamber of the engine.

Preferably, the method comprises supplying HHO gas to a combustion chamber of the engine in order to provide and/or replenish the catalytic hydrogen.

Preferably, the method comprises, in the step of providing and/or replenishing the catalytic hydrogen, supplying the HHO gas at a rate of between 0.01 l/hr and 1.0 l/hr per liter of engine capacity, more preferably between 0.1 l/hr and 0.5 l/hr per liter of engine capacity, and most preferably 0.15 l/hr per liter of engine capacity.

Preferably, the method comprises the step of producing the HHO gas through the electrolysis of an electrolyte.

Preferably, the method comprises supplying the HHO gas to an inlet manifold of the engine.

Preferably, the method comprises regulating the volume of HHO gas supplied to the engine in response to variations in one or more operating parameters of the engine.

Preferably, the method comprises supplying the HHO gas to an upstream and/or low-pressure side of a turbocharger of the engine.

According to a second aspect of the present invention there is provided an engine enhancement system comprising a source of HHO gas operable to supply HHO gas to one or more combustion chambers of the engine at a rate of between 0.01 l/hr and 1.0 l/hr per liter of engine capacity, more preferably between 0.1 l/hr and 0.5 l/hr per liter of engine capacity, and most preferably 0.15 l/hr per liter of engine capacity.

Preferably, the gas source comprises an electrolytic cell.

Preferably, the electrolytic cell comprises a reservoir adapted to contain an electrolyte, and at least a pair of electrical terminals located in the reservoir and across which a voltage may be applied in order to effect electrolysis of the electrolyte.

Preferably, the engine enhancement system comprises a controller operable to vary the voltage applied across the terminals in order to manage the volume of HHO gas produced, in use, by the electrolytic cell.

Preferably, the controller is operable to vary the voltage applied across the terminals in response to variations in one or more operating parameters of the engine.

Preferably, the engine enhancement system comprises one or more sensors operable to provided feedback to the controller.

Preferably, the electrolytic cell is provided with an electrolyte, which undergoes a colour change during electrolysis.

According to a third aspect of the present invention there is provided the use of hydrogen as a combustion catalyst in the combustion of a hydrocarbon fuel within an internal combustion engine.

Preferably, the use comprises supplying the catalytic hydrogen from HHO gas fed at a rate of between 0.01 l/hr and 1.0 l/hr per liter of engine capacity, more preferably between 0.1 l/hr and 0.5 l/hr per liter of engine capacity, and most preferably 0.15 l/hr per liter of engine capacity.

As used herein, the term "HHO gas" is intended to mean oxyhydrogen gas, a mixture of hydrogen and oxygen gas, typically in a 2:1 molar ratio.

As used herein, the term "interstitial site" is intended to mean the empty spaces between atoms of a material, in particular at the exposed surface of the material such that the interstitial sites can be accessed and replenished.

As used herein, the term "surface of a combustion chamber" is intended to mean the cylinder walls of the engine, and/or the top wall of the or each cylinder as normally defined by the cylinder head, and/or an upper surface of the piston within each cylinder, which effectively defines a bottom wall or closure of the cylinder.

As used herein, the term "catalysis" is intended to cover heterogeneous or homogeneous catalysis.

DETAILED DESCRIPTION OF THE DRAWINGS

Figure 1:
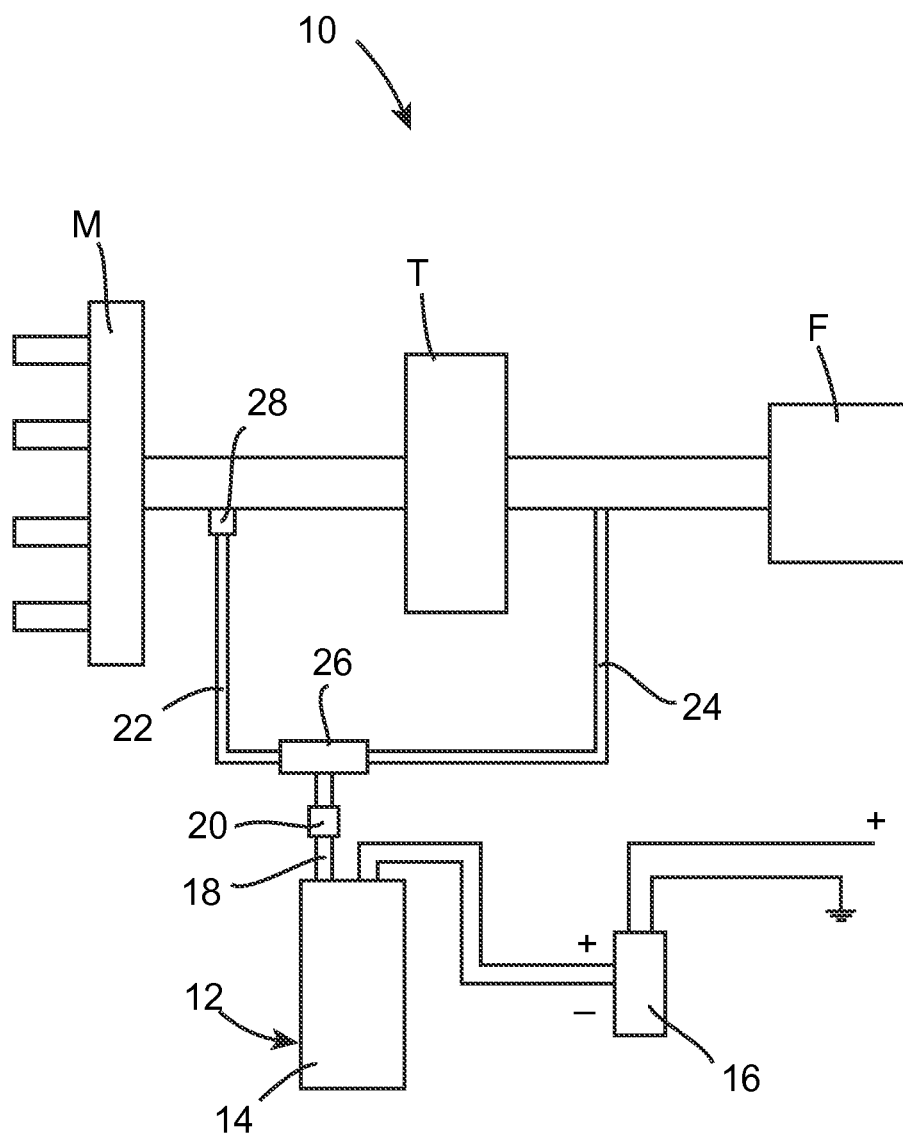
FIG. 1 illustrates a schematic representation of an engine enhancement system according to an embodiment of the present invention, as fitted to a vehicle engine.

Referring now to FIG. 1 of the accompanying drawings there is illustrated a schematic representation of an engine enhancement system, generally indicated as 10, as fitted about a turbo charger T of an engine (not shown), adjacent an inlet manifold M of the engine, and adapted to supply HHO gas to one or more combustion chambers of an engine in order to supply and/or replenish hydrogen as a combustion catalyst in the combustion process. It has been found that HHO gas, or hydrogen, does not act as a fuel in the combustion process, but rather as a combustion catalyst, and is therefore only required in very small quantities. The hydrogen, as supplied for example in the form of HHO gas, is deposited in interstitial sites in the wall of the combustion chambers of the engine, from where it is then available as a heterogeneous combustion catalyst. It may however be the case that the hydrogen can be utilised as a homogeneous catalyst acting in the gaseous phase with the gaseous fuel/air mixture. As the hydrogen is acting as a catalyst, it is then only necessary to supply small quantities of hydrogen in order to supply/replenish the hydrogen, for example at the interstitial sites, as described in greater detail below.

It will however be appreciated from the following description that the means by which the hydrogen is introduced into the combustion chambers of the engine may vary significantly. While the hydrogen, acting as a combustion catalyst, lowers the activation energy of a reaction, namely the combustion of the petroleum fuel, it is not consumed by the reaction. However, given the harsh temperatures and pressures in the internal combustion engine some of the hydrogen is destroyed and therefore the system 10 is provided primarily to replenish this stock.

Figure 5:
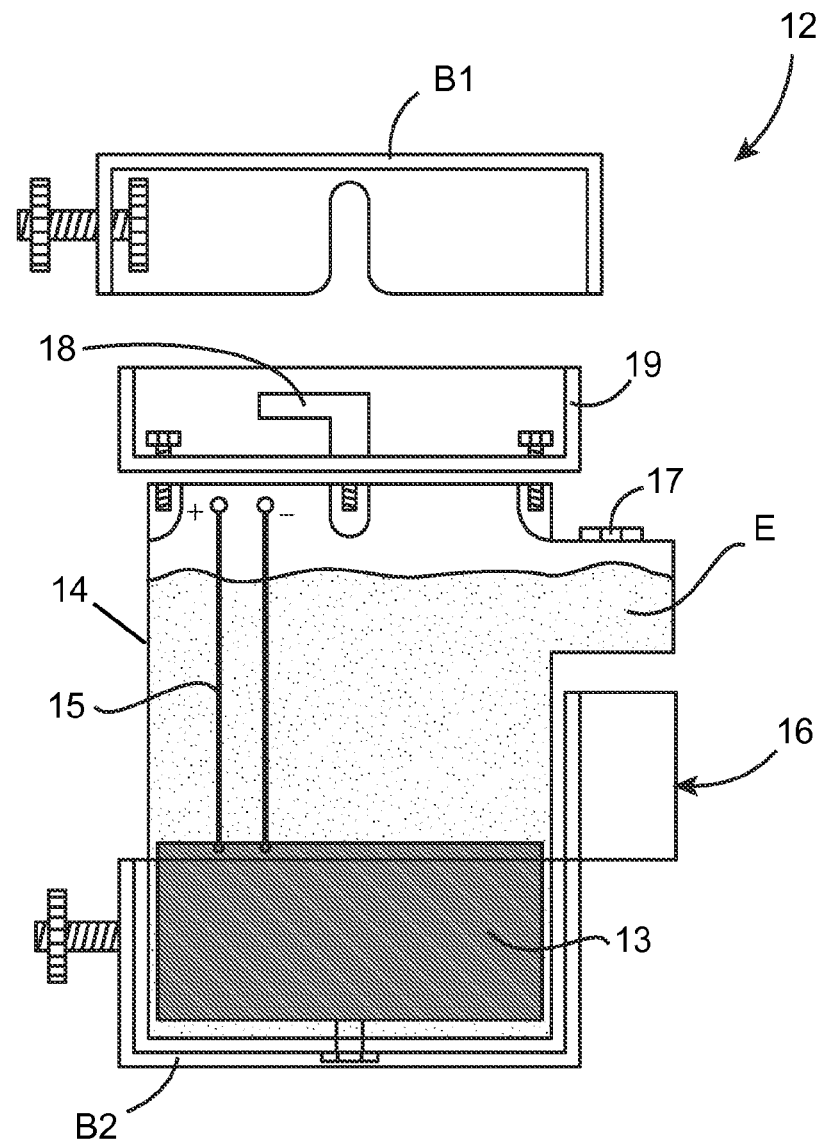
FIG. 5 illustrates a schematic sectioned elevation of an electrolytic cell forming part of the enhancement system shown in FIG. 1.

The enhancement system 10 comprises a gas source in the form of an electrolytic cell 12, illustrated in greater detail in FIG. 5, comprising a reservoir 14 in which, in use, is housed a supply of an electrolyte E. The electrolytic cell 12 further comprises a pair of electrical terminals or electrodes 13 (not shown in FIG. 1) located on the interior of the reservoir 14, preferably at or adjacent a base of the reservoir 14 such as to be immersed in the electrolyte E. In use a suitable voltage is applied across the pair of electrodes 13, via a pair of insulated wires 15 which run internally down the reservoir 14 from a pair of external connectors, from a controller 16, in order to effect electrolysis of the electrolyte E. In the embodiment illustrated the reservoir 14 is provided with a filling cap 17, which permits the electrolyte E to be initially filled, and thereafter refilled, with relative ease. Any other suitable means may however be employed in order to provide the above mentioned functionality.

Although shown separated from the reservoir 14 in FIG. 1, it is preferable from a practical perspective that the controller 16 is mounted directly to the electrolytic cell 12 as shown in FIG. 5. In this way the electrolytic cell 12 and controller 16 can be mounted, for example in the engine bay, as a single unit. In the embodiment illustrated an upper bracket B1 and a lower bracket B2 are provided, between which the electrolytic cell 12 can be retained as illustrated in FIG. 5. Suitable corresponding fixtures or brackets (not shown) can then be provided in the engine bay in order to allow the brackets B1, B2 to be secured in a desired location. Naturally the brackets B1, B2 may be varied in configuration and operation, or replaced with a functional alternative.

As described in detail hereinafter, the controller 16 is preferably operable to vary the voltage applied across the electrodes within the reservoir 14, in order to vary the volume of HHO gas produced. Thus the volume of gas can be matched to the engine speed or other operating parameter(s) of the engine, again as described in detail below. The controller 16 is preferably powered via the vehicle's own electrical system (not shown) although an independent power supply could be provided, such as a dedicated battery or the like. In the embodiment described and shown the voltage control is pulse width modulation, with a maximum current draw of 3 amps, although it will be appreciated that any other type of voltage control may be employed. The controller 16 may also comprise a built in and/or remote display in order to provide operational information such as current/voltage levels, power state, a level indicator, etc.

The electrolytic cell 12 comprises an outlet 18 from which the HHO gas is dispensed, the outlet 18 being provided in and passes through a cover 19, which in use is secured about an upper end of the reservoir 14. The outlet 18, in the embodiment illustrated, then passes through a one-way valve 20, which is configured to permit the uni-directional flow of HHO gas out of the electrolytic cell 12. From here the outlet 18 branches into a first section 22 and a second section 24 via a T-shaped connector 26. The first section 22 is connected into the air intake of the engine, between the turbo-charger T and the inlet manifold M, and thus on the high pressure side of the turbo charger. Conversely the second section 24 is connected into the engine's air intake at a position between the turbo charger T and conventional air filter F, and thus on the low pressure side on the turbo charger T. A restrictor 28 is preferably fitted to the first section 22, and preferably at the point that the first section 22 enters the engine's air intake. In use the pressure difference across the turbo charger T creates a pressure differential between the first section 22 and the second section 24, drawing the HHO gas from the electrolytic cell 12, through the second section 24, and into the low pressure side of the turbo charger T. The HHO gas thus becomes entrained within the air being forced into the engine via the turbo charger T, and which is deposited into each cylinder of the engine via the air inlet manifold M.

It will be appreciated that in the absence of the turbo charger T a single pipe may extend from the electrolytic cell 12 for connection to the air intake of the engine, at any suitable location, and preferably directly upstream of the inlet manifold M. In addition, even when the turbo charger T is present it would be possible to use only a single pipe to connect the electrolytic cell 12 into the air intake of the engine. In this case the first section 22 of pipe would be omitted, and the second section 24 would then be solely used to supply the HHO gas to the low-pressure side of the turbo charger T.

It is also preferable that the electrolytic cell 12 is located in a suitable position, for example within the engine bay, but away or shielded from the heat of the engine. Some form of cooling, for example forced airflow past the electrolytic cell 12, may be employed, and could take the form of a simple fan positioned directly at the electrolytic cell 12. The electrolyte E may also have antifreeze added in order to prevent freezing of the cell 12 during cold weather. The electrolytic cell 12 should also preferably be located in an accessible position, in order to allow refilling of the electrolyte via the filling cap 17. The system 10 may also be adapted to effect the automatic refilling of the electrolytic cell 12, and may also include a level monitoring sensor (not shown) or the like which will generate a warning in the event of low levels of the electrolyte E. The system 10 may also incorporate control means (not shown) capable of automatically reversing the polarity across the electrolytic cell 12 each time the vehicles engine is started. This would ensure that there is even wear of the pair of electrodes 13. Multiple electrolytic cells 12 may also be employed, for example to cater for larger engine sizes. The electrolyte E is also preferably provided with an additive that, once electrolysis has begun, results in the electrolyte E changing colour. This allows the user to quickly and easily identify that the system 10 is operating, and also allows the level of electrolyte E within the reservoir 14 to be quickly determined, either by opening the filling cap 17 or by providing at least a portion of the wall of the reservoir as transparent.

As mentioned above, the voltage provided by the controller 16 to the pair of electrodes 13 within the electrolytic cell 12 may be varied in order to vary the quantity of HHO gas generated. Thus for example less HHO gas may be generated at lower engine speeds and vice versa. The system 10 may incorporate one or more sensors (not shown), or utilise sensors already installed in the vehicle in question, in order to supply data about the operating parameters of the engine to the controller 16, in order to allow the voltage applied to the cell 12 to be varied, and thus the volume of HHO gas generated to be varied to suit the particular operating parameter(s). For example the controller 16 may utilise data from sensors such as a manifold absolute pressure sensor, which detects the amount of vacuum pressure in the manifold for different engine speeds and loads; an air flow sensor which measures the amount of air going into the engine; an air mass meter which measures the mass of air going into the engine by means of temperature; a throttle position sensor; or any other sensors. However on diesel engines there is generally not sufficient vacuum pressure to utilise a manifold absolute pressure sensor as a means of control. It may therefore be necessary to use, for example, an airflow sensor as a means of controlling the voltage applied across the cell 12. Alternatively it is envisaged that some means of effecting a pressure change within the electrolytic cell 12 could be used to force additional HHO gas to the engine manifold.

The system 10 may be formed integrally with an engine, in particular automobile engines, or may be provided as an after market retro-fittable system. The system 10 of the present invention introduces very small quantities of HHO gas into the air intake of an internal combustion engine, which is then mixed with the air and conventional petrol/diesel fuel of the engine, in order to improve the combustion of said fuel within the combustion chambers of the engine. In particular the addition of said quantities of HHO gas act as a combustion catalyst in order to provide a more complete burn of the fuel within the combustion chambers, thus providing extra power from the engine, less emissions, and more miles per gallon, and lowered exhaust temperatures.

Figure 2:
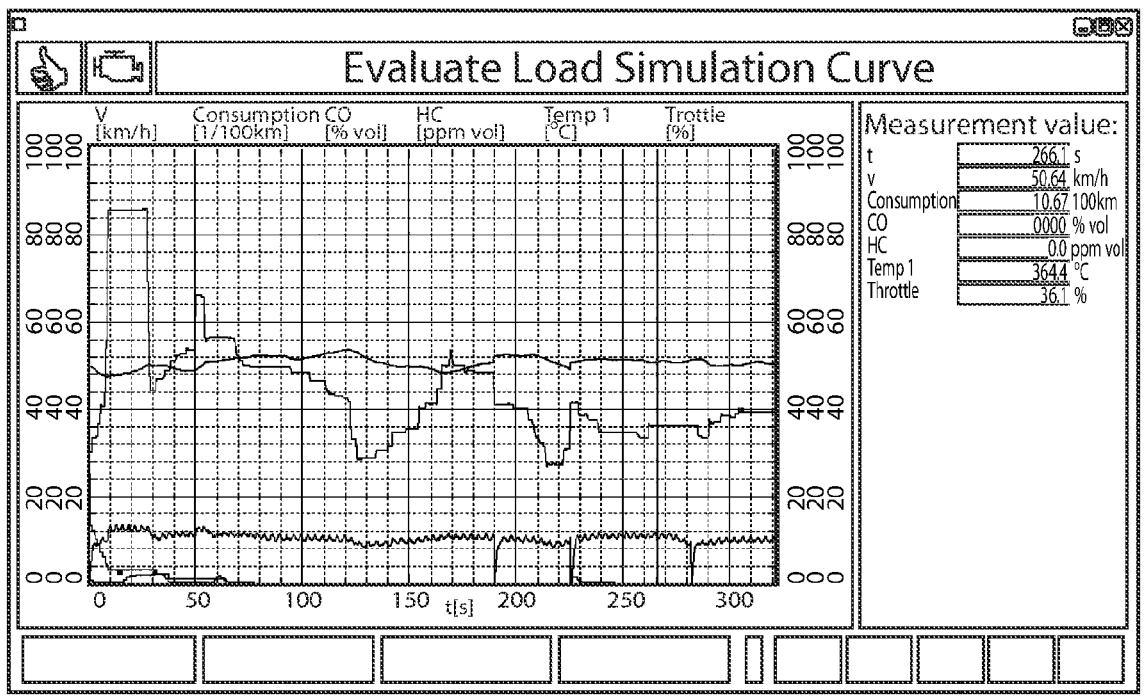
FIG. 2 illustrates a load simulation plot for a vehicle having a conventional internal combustion engine.
Figure 3:
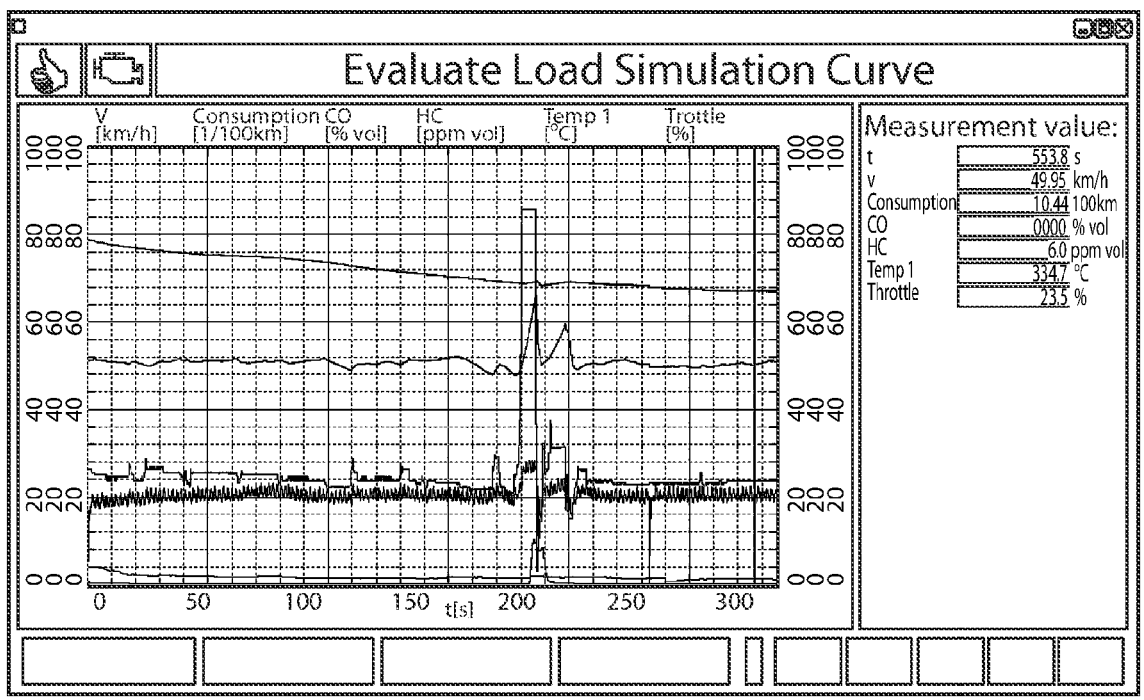
FIG. 3 illustrates a load simulation plot for the same vehicle when the system and method of the present invention are applied thereto.

FIGS. 2 and 3 illustrate the performance improvement achieved via the system and method of the present invention. FIG. 2 illustrates a load simulation plot for a vehicle without the catalytic use of hydrogen according to the present invention. In order to achieve a steady 50 km/h the vehicles throttle had to be set at 36%. Referring to FIG. 3, the same vehicle was retested while utilising hydrogen as a combustion catalyst according to the present invention. In this test, in order to achieve a steady 50 km/h the vehicles throttle had to be set at 23%, clearly illustrating the performance improvement achieved through the use of the method of the present invention. In addition, from the same set of tests, the exhaust temperature was reduced from 364.4° C. without the catalytic hydrogen to 334.7° C. using catalytic hydrogen according to the invention.

Figure 4:
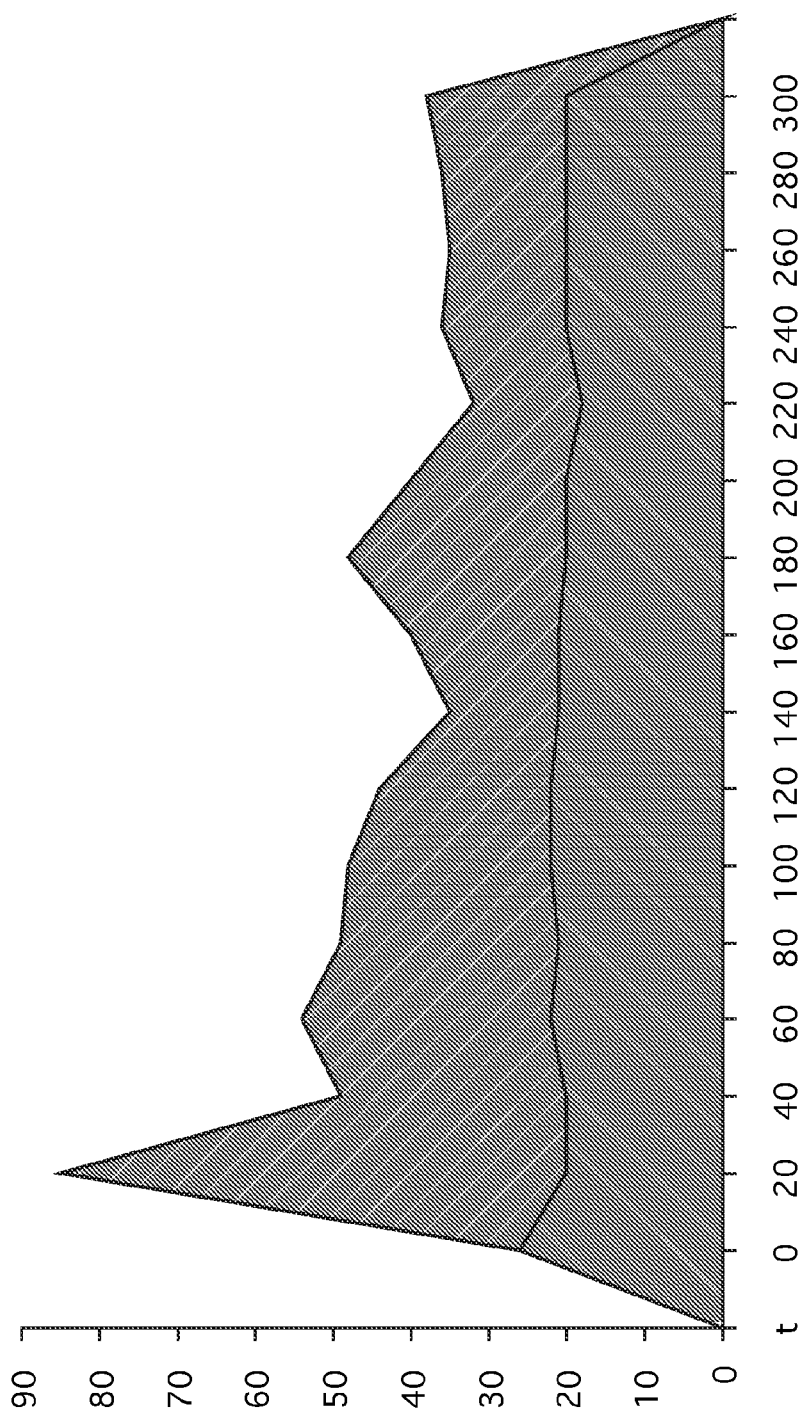
FIG. 4 illustrates a plot a throttle against time for a vehicle with and without the system and method of the present invention applied thereto.

FIG. 4 illustrates how the use of catalytic hydrogen according to the present invention leads to a smoother running vehicle with a more consistent delivery of power. The plot shows the power output for a vehicle with and without the use of the hydrogen catalyst, when the vehicle is running at a fixed speed. The upper plot shows the vehicle without hydrogen catalysis, and clearly illustrates significant fluctuations in power output. The lower plot shows the same vehicle when using hydrogen catalysis according to the present invention, and illustrates the smoother delivery of power that is achieved.

The discovery that hydrogen is acting as a catalyst in the combustion process, as opposed to an actual source of fuel, means that unusually small quantities of HHO gas are sufficient to achieve catalysis, whether in filling and replenishing the interstitial sites with hydrogen for heterogeneous catalysis, or to supply the gaseous hydrogen for mixing with the gaseous fuel/air mix for homogeneous catalysis. The system 10 is preferably adapted to generate between 0.01 l/hr and 1.0 l/hr of HHO gas per liter of engine capacity for delivery to the combustion chambers of the engine, at standard temperature and pressure (STP), more preferably between 0.5 l/hr and 1.0 l/hr per liter of engine capacity, and most preferably 0.15 l/hr. The amount of electrical energy required to generate the volumes of HHO gas is minimum, with the system 10 of the embodiment illustrated requiring a current draw of approximately 0.5 amps and a voltage of between 4 and 9 volts, in order to generate a liter of HHO gas over a period of two hours. The voltage and current may of course vary, both to suit the particular operating parameters of the engine, or to suit the size of the engine to which the system 10 is installed. The HHO gas is only generated as required, again in order to minimise the electrical requirements of the system 10. The system 10 is preferably configured to apply a voltage across the electrolytic cell 12 only when the vehicle's battery is above a predetermined value, for example 12.9 volts, and the engine is running and the alternator is charging. A voltage regulator (not shown) may be provided in order to affect a control function to hold current stable across the electrodes, as the current increases with time. Alternative methods of control may be utilised in order to ensure that the electrolytic cell 12 only operates when the engine is running.

The rate of change of outlet pressure of the electrolytic cell 12 with voltage across the cell 12 for the above voltage range is 1.3-3.3 hPaV$^{-1}$, although it will be appreciated that the invention will work across a broader range, although not as efficiently, and for example using a range of 1.0-5.0 hPaV$^{-1}$.

The above values are calculated using the following formula:

$$[\Delta hPa/\Delta V]_6^9 = 1.0\text{-}5.0 \text{ hPaV}^{-1}$$

Turning then to the method of the present invention, it is submitted that hydrogen from the HHO gas introduced into the combustion chambers is adsorbed into the metal lattice of the cylinder wall and/or top of the pistons. When adsorbed into the lattice the hydrogen forms catalytic sites, causing a more efficient combustion of the petrochemical fuel during operation of the engine. Hydrogen atoms, having a relative small size, are able to migrate into interstitial sites in the wall of the combustion chamber, to perform as a catalyst during the combustion cycle within the engine. The HHO gas supplied to the combustion chambers via the system 10 of the present invention provides the source of the hydrogen atoms that are adsorbed into the metal lattice from where they act as a catalyst. As mentioned above, although not consumed by the combustion reaction, the hydrogen is slowly depleted/destroyed, and so to maintain a sufficient level of hydrogen for catalytic purposes, the system 10 is used to supply very small quantities of HHO gas to the combustion chambers in order to replenish the hydrogen in the interstitial sites.

It will thus be appreciated that it is the hydrogen, in particular the hydrogen in the interstitial sites, as opposed to the supply of HHO gas, that is acting as a catalyst in the combustion reaction. Thus even if the supply of HHO gas is interrupted there will remain hydrogen at the interstitial sites and thus catalysis of the combustion reaction will continue for a period until the interstitial hydrogen is depleted.

Consequently it will be understood that the provision of the interstitial hydrogen could be achieved through mechanisms other than the supply of HHO gas to the combustion chambers, from which the hydrogen is extracted. It will also be appreciated that the introduction of hydrogen to the interstitial sites does not need to take place during the operation of the engine, and could be achieved while the engine is inactive. For example the system 10 of the present invention could be modified to supply the HHO gas to the combustion chambers only while the engine is switched off, slowly building up a supply of interstitial hydrogen, which would then be present as a catalyst once the engine is activated. It will also be appreciated that the source of HHO gas could be varied, for example switching the electrolytic cell 12 for a pressurised canister of HHO gas adapted to release a regulated volume of HHO gas.

In determining that the combustion reaction within the engine is being catalysed, the following calculations were undertaken:

1. Assume the HHO gas is ⅔ hydrogen ⅓ oxygen and behaves as an ideal gas
2. The HHO gas is delivered at approx atmospheric pressure
3. The HHO gas exhibits near ideal properties
4. Flow rate is a max of 750 ml/hr Then No. M of fuel gas $hr^{-1}$ is given by $0.75/22.4=0.0334$ $molhr^{-1}$ (1)

We know this consists of ⅔ v/v hydrogen so No. mol $hr^{-1}$ $H_2=0.0334\times⅔=0.0223$ (2)

From tables $-\Delta H$ ($H_2$) is $-285.8$ $KJmol^{-1}$

So total energy available at 100% efficiency from $H_2$ $hr^{-1}=0.0223\times285.8$ $KJ=6.36$ $KJhr^{-1}$ (3)

Further Assumptions
1. Petrol fuel is 100% Octane $C_8H_{18}$
2. Running at 2,500 rev $min^{-1}$ average engine consumes 1 UK gall $hr^{-1}$ From tables density at STP of octane is 0.918 g/cc So 1 UK gall ca 4.5l weighs 4,500×0.918 g=4160 g (4)

Given assumptions MW $C_8H_{18}$ is approx 114 amu (5)

Then from (4) and (5) No mol $hr^{-4}$ octane=4160/114=36.5 mol $hr^{-4}$ (6)

From tables $-\Delta H$(octane) is 5512 $KJmol^{-1}$ (7)

From (6) and (7) Energy contribution from octane=36.5×5512 KJ=2×10⁵ $KJhr^{-1}$ (8)

The Energy contribution of $H_2$ is therefore from (3)/(8)×100=3.16×10⁻³% (9)

It is thus concluded that the mechanism of the reaction must be catalytic as under perfect conditions a performance increase of some four orders of magnitude has been achieved.

In a particular example, the enhancement system 10 of the present the electrolytic cell 12 is provided with an electrolyte capacity of approximately 300 ml, and preferably with a headspace above the electrolyte E of approximately 70 ml, and it has been observed that a decrease in headspace results in an increase in pressure. The pair of electrodes 13 were manufactured from 316 stainless steel and preferably coated with platinum of approximately 1 micron thickness.

The controller 16 was adapted to output a voltage range of between 3-9 volts and a current range of 0-3 amps, wherein the standard setting of the controller 16 was 7V-0.34 amps. The controller 16 included means of holding the amps constant at a preset level.

The system 10 was retrofitted to a vehicle having a normally aspirated diesel engine with a capacity of 1868 cc, and for this engine it was found that the most efficient performance of the electrolytic cell 12 was achieved when operating at a voltage of between 4-9V and a current draw of approximately 0.34 amps, although this may vary depending on numerous parameters such as engine capacity, external environmental conditions, engine operating speed, etc.

Thus the method of the present invention provides a performance improvement in a combustion engine, in particular by providing hydrogen as a catalyst in the combustion process in order to increase the power generated by the engine by ensuring a more complete combustion of the fuel air mixture, reducing the emissions from the engine's exhaust, and as a result rendering the vehicle easier to drive, requiring less gear changing, which thus puts less stress on the engine and transmission, and allows the engine to run slightly cooler.

The invention claimed is:

1. A method of combusting a hydrocarbon fuel in an internal combustion engine, the method comprising steps of:
utilizing hydrogen as a combustion catalyst during combustion of the fuel by supplying HHO gas at a rate of between 0.01 l/hr and 1.0 l/hr per liter of engine capacity to a combustion chamber of the engine in order to provide and/or replenish the catalytic hydrogen; and
supplying the HHO gas to an upstream and/or low-pressure side of a turbocharger of the engine.

2. The method according to claim 1 comprising producing the HHO gas through an electrolysis of an electrolyte.

3. The method according to claim 1 comprising supplying the HHO gas to an inlet manifold of the engine.

4. The method according to claim 1 comprising regulating a volume of HHO gas supplied to the engine in response to variations in one or more operating parameters of the engine.

5. An engine enhancement system comprising a source of HHO gas operable to supply HHO gas to an upstream and/or low-pressure side of a turbocharger of an engine at a rate of between 0.01 l/hr and 1.0 l/hr per liter of engine capacity.

6. The engine enhancement system according to claim 5 in which the source of HHO gas comprises an electrolytic cell.

7. The engine enhancement system according to claim 6 in which the electrolytic cell comprises a reservoir adapted to contain an electrolyte, and at least a pair of electrical terminals located in the reservoir and across which a voltage may be applied in order to effect electrolysis of the electrolyte.

8. The engine enhancement system according to claim 7 comprising a controller operable to vary the voltage applied across the terminals in order to manage a volume of HHO gas produced, in use, by the electrolytic cell.

9. The engine enhancement system according to claim 8 in which the controller is operable to vary the voltage applied across the terminals in response to variations in one or more operating parameters of the engine.

10. The engine enhancement system according to claim 8 comprising one or more sensors operable to provide feedback to the controller.

11. The engine enhancement system according to claim 6 in which the electrolytic cell is provided with an electrolyte, which undergoes a colour change during electrolysis.

12. A method for using hydrogen as a combustion catalyst for combustion of a hydrocarbon fuel within an internal combustion engine comprising supplying catalytic hydrogen from HHO gas fed to an upstream and/or low-pressure side of a turbocharger of the engine at a rate of between 0.01 l/hr and 1.0 l/hr per liter of engine capacity.

* * * * *